(12) United States Patent
Dumont et al.

(10) Patent No.: US 8,828,551 B2
(45) Date of Patent: *Sep. 9, 2014

(54) SILICONE COMPOSITION AND PROCESS THAT IS USEFUL FOR IMPROVING THE TEAR STRENGTH AND THE COMBING STRENGTH OF AN INFLATABLE BAG FOR PROTECTING AN OCCUPANT OF A VEHICLE

(75) Inventors: Laurent Dumont, LaMotte Servolex (FR); Alain Pouchelon, Meyzieu (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,123

(22) Filed: Jul. 25, 2012

(65) Prior Publication Data

US 2012/0289111 A1 Nov. 15, 2012

Related U.S. Application Data

(63) Continuation of application No. 10/978,406, filed on Nov. 2, 2004, now Pat. No. 8,257,797.

(60) Provisional application No. 60/524,618, filed on Nov. 25, 2003.

(30) Foreign Application Priority Data

Nov. 3, 2003 (FR) ..................... 03 12845

(51) Int. Cl.
  *C08L 83/04* (2006.01)
  *B32B 25/20* (2006.01)
(52) U.S. Cl.
  USPC ........ 428/447; 427/387; 427/515; 428/474.4; 524/268; 524/425; 524/588; 525/477; 525/478; 528/15; 528/31; 528/32
(58) Field of Classification Search
  None
  See application file for complete search history.

(56) References Cited

U.S. PATENT DOCUMENTS

| 4,450,283 A | 5/1984 | McAfee et al. |
| 4,618,522 A | 10/1986 | Modic |
| 4,699,813 A | 10/1987 | Cavezzan |
| 4,741,966 A | 5/1988 | Cavezzan |
| 5,296,298 A | 3/1994 | Fujimoto et al. |
| 5,658,674 A | 8/1997 | Lorenzetti et al. |
| 5,783,311 A | 7/1998 | Lorenzetti et al. |
| 5,789,084 A | 8/1998 | Nakamura et al. |
| 6,387,451 B1 | 5/2002 | Collins et al. |
| 7,008,697 B2 | 3/2006 | Aketa et al. |
| 2003/0105262 A1 | 6/2003 | Mueller et al. |

FOREIGN PATENT DOCUMENTS

| EP | 0533840 A1 | 3/1993 |
| EP | 0681014 A1 | 11/1995 |
| WO | 92/00067 A2 | 1/1992 |
| WO | 01/12894 A1 | 2/2001 |
| WO | WO 2004/070102 A2 * | 8/2004 |

OTHER PUBLICATIONS

Translation of Written Opinion for PCT/FR2004/002791 dated Aug. 29, 2006.
International Search Report for PCT/FR2004/002791 dated Apr. 27, 2005.

* cited by examiner

*Primary Examiner* — Marc Zimmer
(74) *Attorney, Agent, or Firm* — Dentons US LLP

(57) ABSTRACT

The general field of the invention is that of airbags. The invention relates to a process for improving the tear strength and the combing strength of coated fabrics intended for uses in the field of inflatable bags, using a silicone composition comprising an additive consisting of a polyorganosiloxane resin (V) and a calcium carbonate. After coating the composition onto the fabric supports and curing, the coated supports not only have optimum adhesion and crease resistance properties, but also have good properties in terms of combing strength and tear strength.

34 Claims, No Drawings

SILICONE COMPOSITION AND PROCESS THAT IS USEFUL FOR IMPROVING THE TEAR STRENGTH AND THE COMBING STRENGTH OF AN INFLATABLE BAG FOR PROTECTING AN OCCUPANT OF A VEHICLE

This application is a continuation of U.S. application Ser. No. 10/978,406, filed Nov. 2, 2004, now allowed, which claims benefit of U.S. Provisional Application No. 60/524,618, filed Nov. 25, 2003 and also claims foreign priority of FR03/12845, filed Nov. 3, 2003, each hereby expressly incorporated by reference in its entirety and each assigned to the assignee hereof.

The general field of the invention is that of silicone coating compositions, in particular those of the two-pack or multi-pack type, which cure by polyaddition or hydrosilylation reactions to produce an elastomer as a thin layer. These cured compositions are adapted, inter alia, as coatings, for example for the protection or the mechanical reinforcement of various textile substrates, for instance woven, knitted or nonwoven fibrous supports.

Such silicone coatings are generally obtained by coating the substrate followed by hardening following from the polyaddition of the unsaturated groups (alkenyl groups, e.g. Si-Vi) of a polyorganosiloxane on hydrogens thereof or of another polyorganosiloxane.

These silicone compositions have found a major application in the coating of flexible—woven, knitted or nonwoven—materials used for manufacturing personal protection bags for the occupants of vehicles, also known as "airbags".

For further details regarding these personal protection bags or "airbags", reference may be made especially to French patent FR-A-2 668 106.

The present invention also relates to the application of silicones in the manufacture of such protection bags.

Historically, these bags are formed by a web of synthetic fibre, for example polyamide (Nylon®), coated on at least one of its faces with a layer of an elastomer such as chloroprene. The presence of such a layer or of such a protective coating is dictated by the fact that the gases liberated by the gas generator (for example: carbon monoxide, NOx) in the event of an impact are extremely hot and contain incandescent particles that are liable to damage the Nylon® bag.

The inner elastomeric protective layer must thus be particularly resistant to high temperatures and to mechanical stresses. It is also important for this elastomeric coating to be in the form of a thin, uniform film that adheres fully to the synthetic fabric support, forming the walls of the airbag.

Silicone compositions have easily supplanted chloroprenes in this application, since it turns out that chloroprenes do not satisfy all the above-targeted specifications.

However, another constraint has currently emerged and requires new solutions. The use of gas generators that are more mechanically and thermally aggressive entails additional constraints on the stitching of the airbag. These are in addition to the physical constraints associated with the deployment of the inflatable bag and may result in ripping of the elastomer-coated fabric and opening of these stitches. This results in a point of escape of hot gases, arising from the generator, through the stitches, giving rise to weak points that are the cause of tearing, combing (fraying) or even bursting of certain airbags. Consequently, airbag manufacturers are in search of silicone elastomeric coating compositions for applications that have optimum mechanical properties, especially good tear strength and combing strength (capacity of the coated fabric to withstand combing of the stitches of the inflatable bag). Specifically, the combing strength is becoming an increasingly important criterion for this industry since the constraints due to the combing of the stitches of the inflatable bag are comparable to those observed during the deployment of an airbag in service.

One of the major problems currently encountered in the use of fabrics coated with silicone elastomers in airbags lies in the fact that they have either good combing strength or good tear strength. Obtaining a good compromise between these two properties, while at the same time maintaining good properties in terms of adhesion and thinness, is fundamental and is currently the focus of extensive research. Furthermore, airbag manufacturers are also in search of novel solutions for reducing their manufacturing costs, especially by using decontextured fabrics (reduction of the number of yarns per centimeter), which also requires control of the combing strength and the tear strength of the fabrics coated with silicone elastomers.

The prior art EP-A-0 533 840 and U.S. Pat. No. 5,296,298 describe silicone compositions for airbag applications.

According to EP-A-0 553 840, these known silicone compositions comprise:
(A) a polydiorganosiloxane containing at least two alkenyl groups per molecule,
(B) a polyorganohydrogenosiloxane containing at least two hydrogen atoms linked to silicon in each molecule,
(C) a metallic catalyst of the platinum group,
(D) an adhesion promoter consisting of an epoxy-functional organosilicon compound,
(E) a mineral filler, the weight amount of which is defined relative to the amount of the polyorganosiloxane (A),
(F) a resin polyorganosiloxane, and optionally
(G) a compound that is useful as a curing inhibitor.

However, the said reference only presents solutions for obtaining homogeneous and adhesive films for airbag coatings and is silent as regards solving the problem mentioned above.

According to U.S. Pat. No. 5,296,298, these silicone compositions comprise:
(A) a polydiorganosiloxane containing at least two alkenyl groups per molecule,
(B) a polyorganohydrogenosiloxane containing at least two hydrogen atoms linked to silicon in each molecule,
(C) a silane containing a methacrylic function,
(D) an epoxyalkoxysilane,
(E) an aluminium chelate, and
(F) a metallic catalyst of the platinum group.

In the said reference, the fillers are mentioned only as options, while providing solutions only for obtaining silicone films that show good adhesion to the airbag support. These compositions are not adapted to the new expectations of airbag manufacturers as regards controlling the combing strength and tear strength properties.

Document EP-A-0 681 014 describes a silicone composition, which may be applied especially as an airbag lining and which has for this purpose good properties especially in terms of fire resistance and heat resistance, mechanical properties, ageing behaviour, adhesion and surface uniformity, the adhesion to textile substrates being more particularly desired. The solution proposed by the said invention consists in using:
a silicone coating composition consisting of a mixture formed from:
(1) at least one polyorganosiloxane containing, per molecule, at least two C2-C6 alkenyl groups linked to silicon,
(2) at least one polyorganosiloxane containing, per molecule, at least two hydrogen atoms linked to silicon, (3) a catalytically effective amount of at least one catalyst, composed of at least one metal belonging to the platinum group,
(4) an adhesion promoter,
(5) optionally, a mineral filler,
(6) optionally, at least one curing inhibitor, and
(7) optionally, at least one polyorganosiloxane resin,
in which composition the adhesion promoter consists exclusively of an at least ternary combination of the following ingredients:
 (4-1) at least one alkoxylated organosiloxane containing, per molecule, at least one C2-C6 alkenyl group,
 (4-2) at least one organosilicon compound comprising at least one epoxy radical, and
 (4-3) at least one metal chelate M and/or a metal alkoxide of general formula: M(OJ)n, with n=valency of M and J=linear or branched C1-C8 alkyl, M being chosen from the group formed by: Ti, Zr, Ge, Li, Mn, Fe, Al and Mg.

It should be noted that a reinforcing filler such as a pyrogenic silica is always present in the experimental section of document EP-A-0 681 014. These compositions are not adapted to the new expectations of airbag manufacturers as regards controlling the combing strength and tear strength properties.

The present invention is directed towards overcoming the drawbacks of the prior art.

In this perspective, one of the essential objectives of the invention is to provide a process for improving the combing strength and the tear strength of a woven, knitted or nonwoven fibrous support. These supports treated by means of the process according to the invention are useful especially for applications in the field of inflatable safety bags for vehicles, or airbags, which have not only optimum properties in terms of adhesion, thinness, lightness and resistance to creasing and to abrasion ("scrub" test), but also good combing strength and tear strength properties.

A second objective of the invention is to provide a silicone coating composition that may be cured by polyaddition reactions, which is useful especially for applications in the field of inflatable safety bags for vehicles, or airbags, which has after curing optimum properties in terms of adhesion, thinness, lightness and resistance to creasing and to abrasion ("scrub" test), but also good combing strength and tear strength properties.

A third objective of the invention is to provide a silicone coating composition that may be cured by polyaddition reactions, for airbags, which is easy to use and to apply, and which is also economical.

Finally, another objective of the invention is to allow a reduction in the cost of the coating so as to broaden the field of use of the silicone coating and thus to exploit the advantageous properties of this type of coating in applications that are at the present time excluded from the field of application for reasons of cost.

These objectives, among others, are achieved by the invention, which consists of a process for improving the combing strength and the tear strength of a woven, knitted or nonwoven fibrous support, comprising the following steps:
a) the preparation of a curable silicone coating composition (A) comprising:
 components (a-1) or (a-2):
  (a-1) corresponding to at least one polyorganosiloxane that may be cured by the action of a catalyst based on at least one organic peroxide, and
  (a-2) corresponding to a polyorganosiloxane blend that may be cured by polyaddition reactions, comprising:
   at least one polyorganosiloxane (I) containing, per molecule, at least two C2-C6 alkenyl groups linked to silicon, and
   at least one polyorganosiloxane (II) containing, per molecule, at least two hydrogen atoms linked to silicon,
  an effective amount of curing catalyst consisting: when (a-1) is used, of at least one organic peroxide, and when (a-2) is used, of at least one metal (or compound) of the platinum group,
 optionally, at least one adhesion promoter (IV), and
 an additive system (B) for improving the combing strength and the tear strength, the constituents of which are added sequentially or simultaneously, consisting of a mixture of:
  at least one polyorganosiloxane resin (V) present at up to 60% by weight relative to the total weight of the mixture and optionally mixed with at least one polyorganosiloxane serving as diluent, and
  calcium carbonate ($CaCO_3$) present at up to 30% by weight relative to the total weight of the mixture;
b) the application of at least 10 $g/m^2$, preferably at least 20 $g/m^2$ and more preferably at least 30 $g/m^2$, to one or two faces of a woven, knitted or nonwoven fibrous support of the silicone coating composition (A) prepared in step a), and
c) the curing of the deposit formed in step b) to form an elastomer by heating to a temperature that may be up to 210° C., by electromagnetic radiation, in particular by infrared radiation.

It is to the Applicant's credit to have demonstrated the importance of the additive system (B) for the purpose of controlling the combing strength and the tear strength of a woven, knitted or nonwoven fibrous support. The calcium carbonate does not need to undergo a compatibilization treatment (by heating or surface treatment) in order to be used in the system (B) and therefore cannot be likened to a simple semi-reinforcing filler. It was not at all foreseeable that the combination of the resin (V) and of calcium carbonate, in an implementation not requiring a compatibilization treatment, would ultimately lead to such a marked improvement in the combing strength and tear strength properties of a woven, knitted or nonwoven fibrous support especially for applications in airbags.

This is all the more surprising since this gain does not become lost at the expense of the other hardness, mechanical strength, surface uniformity and heat resistance properties of the silicone coating.

The polyorganosiloxane (al) that is curable by the action of a catalyst based on at least one organic peroxide is advantageously a product containing siloxyl units of formula:

$$R_a^1 SiO \frac{(4-a)}{2} \qquad (I-1)$$

in which:
 the symbols $R^1$, which may be identical or different, represent a hydrocarbon-based group containing from 1 to 12 carbon atoms and preferably from 1 to 8 carbon atoms, which is optionally substituted, and
 a is 1, 2 or 3.
Preferably, the symbols $R^1$ are chosen from:
 methyl, ethyl, propyl, butyl, hexyl and dodecyl groups,
 cycloalkyl groups, for instance cyclohexyl,
 alkenyl groups, for instance vinyl, allyl, butenyl and hexenyl groups, aryl groups, for instance phenyl, tolyl and aralkyl groups such as β-phenylpropyl, and the groups mentioned above in which one or more hydrogen atoms are replaced with one or more halogen atom, a cyano group or a cyano group equivalent, for instance a chloromethyl, trifluoropropyl or cyanoethyl.

Even more preferentially, the polyorganosiloxanes (a-1) are terminated at the chain ends with trimethylsilyl, dimethylvinyl, dimethylhydroxysilyl or trivinylsilyl units.

In one particularly advantageous embodiment, the polyorganosiloxanes (a-1) contain at least two alkenyl groups per molecule.

Among the organic peroxides that may be used according to the invention, mention may be made of benzoyl peroxide, bis(p-chlorobenzoyl) peroxide, bis(2,4-dichlorobenzoyl) peroxide, dicumyl peroxide, di-t-butyl peroxide, 2,5-dimethyl-2,5-di(t-butylperoxy)hexane, t-butyl perbenzoate, t-butylcumyl peroxide, halogenated derivatives of the peroxides mentioned above, for instance bis(2,4-dichlorobenzoyl) peroxide, 1,6-bis(p-toluoylperoxycarbonyloxy)hexane, 1,6-bis(benzoylperoxycarbonyloxy)hexane, 1,6-bis(p-toluoylperoxycarbonyloxy)butane and 1,6-bis(2,4-dimethylbenzoylperoxycarbonyloxy)hexane.

According to one preferred embodiment of the process according to the invention, the curable silicone coating composition (A) used comprises polyorganosiloxanes that may be cured by polyaddition reactions. This composition (A) comprises a mixture formed from:
(a) at least one polyorganosiloxane (I) containing, per molecule, at least two C2-C6 alkenyl groups linked to silicon,
(b) at least one polyorganosiloxane (II) containing, per molecule, at least two hydrogen atoms linked to silicon,
(c) a catalytically effective amount of at least one catalyst (III), composed of at least one metal belonging to the platinum group,
(d) at least one adhesion promoter (IV),
(e) an additive system (B) for improving the combing strength and the tear strength, the constituents of which are added sequentially or simultaneously, consisting of a mixture formed from:
at least one polyorganosiloxane resin (V) present at up to 60% by weight relative to the total weight of the mixture and optionally mixed with at least one polyorganosiloxane serving as diluent, and
calcium carbonate ($CaCO_3$) present at up to 30% by weight relative to the total weight of the mixture;
(f) optionally, at least one curing inhibitor (VI),
(h) optionally, at least one coloration additive (VII), and
(i) optionally, at least one additive (VIII) for improving the fire resistance.

In accordance with one preferred arrangement of the process according to the invention, the amount of calcium carbonate in the additive system (B) is between 4% and 26% by weight and even more preferably between 10% and 24% by weight relative to the total weight of the mixture.

The choice of these specific intervals is one of the determining criteria as regards resolving the problem of improving the combing strength and tear strength properties. Another important criterion is the presence of the polyorganosiloxane resin (V) in the additive system (B) present at up to 60% by weight, preferably up to 40% by weight and even more preferably in a proportion of from 11% to 30% by weight or from 15% to 25% by weight, relative to the total weight of the mixture.

We have also discovered that, in order to obtain an optimum effect, it suffices to perform the process according to the invention with an additive system (B) comprising 5% to 30% by weight of polyorganosiloxane resin (V) and 5% to 25% by weight of calcium carbonate relative to the total weight of the mixture.

The resin (V) preferably comprises at least one alkenyl residue in its structure. According to one preferred mode, the polyorganosiloxane resin (V) comprises siloxyl units Q of formula $SiO_{4/2}$.

According to another particular mode, the polyorganosiloxane resin (V) comprises in its structure from 0.1% to 20% by weight preferably greater than 4% by weight and of alkenyl group(s), the said structure containing identical or different siloxyl units of type M, identical or different siloxyl units of type(s) T and/or Q, and optionally siloxyl units of type D.

In a particularly preferred manner, the polyorganosiloxane resin (V) comprises at least 2% by weight and preferably at least 5% by weight of siloxyl units of type Q.

These resins (V) are well-known and commercially available branched organopolysiloxane oligomers or polymers. They are in the form of solutions, preferably siloxane solutions. They have in their structure at least two different units chosen from those of formulae $R_3SiO_{0.5}$ (unit M), $R_2SiO$ (unit D), $RSiO_{1.5}$ (unit T) and $SiO_2$ (unit Q), at least one of these units being a unit T or Q.

The radicals R are identical or different and are chosen from linear or branched $C_1$-C6 alkyl radicals, C2-C4 alkenyl radicals, phenyl and 3,3,3-trifluoropropyl. Mention may be made, for example, of: as alkyl radicals R, methyl, ethyl, isopropyl, tert-butyl and h-hexyl radicals, and as alkenyl radicals R, vinyl radicals.

It should be understood that in the resins (V) of the above-mentioned type, some of the radicals R are alkenyl radicals.

As examples of branched organopolysiloxane oligomers or polymers, mention may be made of resins MQ, resins MDQ, resins TD and resins MDT, the alkenyl functions possibly being borne by the units M, D and/or T. As examples of resins that are particularly suitable, mention may be made of vinyl MDQ resins with a weight content of vinyl group of between 0.2% and 10% by weight.

Without this being limiting, it may be considered that the adhesion promoter (IV) exclusively comprises:
(IV.1) at least one alkoxylated organosilane containing, per molecule, at least one C2-C6 alkenyl group,
(IV.2) at last one organosilicon compound comprising at least one epoxy radical, and
(IV.3) at least one metal chelate M and/or a metal alkoxide of general formula: M(OJ)n, with n=valency of M and J=linear or branched C1-C8 alkyl,
M being chosen from the group formed by: Ti, Zr, Ge, Li, Mn, Fe, Al and Mg.

In accordance with one preferred arrangement of the invention, the alkoxylated organosilane (IV.1) of the promoter (IV) is selected from the products having the following general formula:

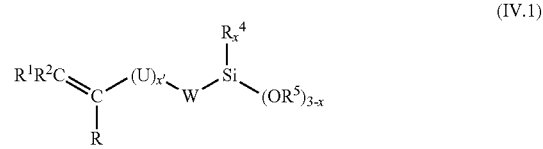

(IV.1)

in which formula:
R1, R2 and R3 are identical or different hydrogenated or hydrocarbon-based radicals and represent hydrogen, a linear or branched C1-C4 alkyl or a phenyl optionally substituted with at least one C1-C3 alkyl, U is a linear or branched C1-C4 alkylene, W is a valency bond, R4 and R5 are identical or different radicals and represent a linear or branched C1-C4 alkyl radical, x'=0 or 1, and x=0 to 2.

Without this being limiting, it may be considered that the vinyltrimethoxysilane is a particularly suitable compound (IV.1).

As regards the organosilicon compound (IV.2), it is envisaged in accordance with the invention to choose it from:

a) either the products (IV.2a) corresponding to the following general formula:

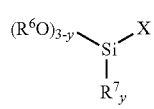

(IV.2a)

in which formula:

R6 is a linear or branched C1-C4 alkyl radical,

R7 is a linear or branched alkyl radical, y is equal to 0, 1, 2 or 3, and

X being defined by the following formula:

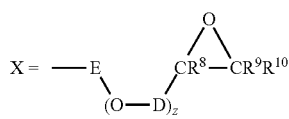

with:

E and D, which are identical or different radicals chosen from linear or branched C1-C4 alkyls, z, which is equal to 0 or 1, R8, R9p and R10, which are identical or different radicals representing hydrogen or a linear or branched C1-C4 alkyl, and R8 and R9 or R10 alternatively possibly constituting, together and with the two carbons bearing the epoxy, a 5- to 7-membered alkyl ring, b) or from the products (IV.2b) consisting of epoxy-functional polydiorganosiloxanes comprising:

(i) at least one siloxyl unit of formula:

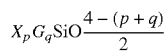

(IV.2 b1)

in which formula:

X is the radical as defined above for formula (IV.2a)

G is a monovalent hydrocarbon-based group, free of unfavourable action on the activity of the catalyst and chosen from alkyl groups containing from 1 to 8 carbon atoms inclusive, optionally substituted with at least one halogen atom, and also from aryl groups, p=1 or 2, q=0, 1 or 2, p+q=1, 2 or 3, and (2i) optionally at least one siloxyl unit of formula:

(IV.2 b2)

in which formula G has the same meaning as above and r is equal to 0, 1, 2 or 3.

As regards the last compound (IV.3) of the adhesion promoter (IV) of the silicone composition according to the invention, the preferred products are those for which the metal M of the chelate and/or of the alkoxide (IV.3) is chosen from the following list: Ti, Zr, Ge, Li or Mn. It should be pointed out that titanium is more particularly preferred. It may be combined, for example, with an alkoxy radical such as butoxy.

The adhesion promoter (IV) may be formed from:

(IV.1) alone
(IV.2) alone
(IV.1)+(IV.2)

according to two preferred embodiments:

(IV.1)+(IV.3)
(IV.2)+(IV.3)

and finally, according to the most preferred embodiment:

(IV.1)+(IV.2)+(IV.3).

According to the invention, an advantageous combination for forming the adhesion promoter is as follows:

vinyltrimethoxysilane (VTMO), 3-glycidoxypropyltrimethoxysilane (GLYMO) and butyl titanate.

In quantitative terms, it may be pointed out that the weight proportions between (IV.1), (IV.2) and (IV.3), expressed as weight percentages relative to the total of the three, are as follows:

(IVA)≥10%, preferably between 15 and 70% and even more preferably between 25 and 65%, (IV.2)≤90%, preferably between 70 and 15% and even more preferably between 65 and 25%, and (IV.3)≥1%, preferably between 5 and 25% and even more preferably between 8 and 18%, it being understood that the sum of these proportions of (IV.1), (IV.2) and (IV.3) is equal to 100%.

For better adhesion properties, the weight ratio (IV.2):(IV.1) is preferably between 2:1 and 0.5:1, the ratio 1:1 being more particularly preferred.

Advantageously, the adhesion promoter (IV) is present in a proportion of from 0.1% to 10%, preferably 0.5% to 5% and even more preferably 1% to 3% by weight relative to all of the constituents of composition (A).

The polyorganosiloxane (I) is one of the essential constituents of composition (A) for the mode of curing by polyaddition reactions. Advantageously, it is a product comprising:

(i) siloxyl units of formula:

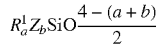

(I-1)

in which:

the symbols $R^1$ represent an alkenyl group, preferably vinyl or allyl, the symbols Z, which may be identical or different, each represent a monovalent hydrocarbon-based group, free of unfavourable action on the activity of the catalyst and chosen from alkyl groups containing from 1 to 8 carbon atoms inclusive, optionally substituted with at least one halogen atom, and also from aryl groups, a is 1 or 2, b is 0, 1 or 2 and the sum a+b is equal to 1, 2 or 3, and optionally (ii) other siloxyl units of formula:

$$Z_c SiO \frac{4-c}{2} \qquad (I\text{-}2)$$

in which:
Z has the same meaning as above and c is 0, 1, 2 or 3.

This polydiorganosiloxane (I) may have a viscosity at least equal to 200 mPa·s and preferably less than 200,000 mPa·s.

All the viscosities concerned in the present specification correspond to a dynamic viscosity magnitude that is measured, in a manner that is known per se, at 25° C.

The polyorganosiloxane (I) may be formed solely from units of formula (I-1) or may contain, in addition, units of formula (I-2). Similarly, it may have a linear, branched, cyclic or network structure. Z is generally chosen from methyl, ethyl and phenyl radicals, 60 mol % (or in numerical terms) at least of the radicals Z being methyl radicals. Examples of siloxyl units of formula (I-1) are vinyldimethylsiloxyl, vinylphenylmethylsiloxyl, vinylmethylsiloxyl and vinylsiloxyl units.

Examples of siloxyl units of formula (I-2) are the units $SiO_{4/2}$, dimethylsiloxyl, methylphenylsiloxyl, diphenylsiloxyl, methylsiloxyl and phenylsiloxyl. Examples of polyorganosiloxanes (I) are linear and cyclic compounds, for instance: dimethylpolysiloxanes containing dimethylvinylsilyl end groups, (methylvinyl)(dimethyl)polysiloxane copolymers containing trimethylsilyl end groups, (methylvinyl) (dimethyl)polysiloxane copolymers containing dimethylvinylsilyl end groups and cyclic methylvinylpolysiloxanes.

Advantageously, the polyorganosiloxane (II) comprises siloxyl units of formula:

$$H_d L_e SiO \frac{4-(d+e)}{2} \qquad (II\text{-}1)$$

in which:
the groups L, which may be identical or different, each represent a monovalent hydrocarbon-based group, free of unfavourable action on the activity of the catalyst and chosen, preferably, from an alkyl group containing from 1 to 8 carbon atoms inclusive, optionally substituted with at least one halogen atom, advantageously from methyl, ethyl, propyl and 3,3,3-trifluoropropyl groups, an aryl group, and advantageously a xylyl, tolyl or phenyl radical,
d is 1 or 2, e is 0, 1 or 2, the sum d+e is equal to 1, 2 or 3, and
optionally, at least some of the other units being units of mean formula:

$$L_g SiO \frac{4-g}{2} \qquad (II\text{-}2)$$

in which the groups L have the same meaning as above and g is equal to 0, 1, 2 or 3.

The dynamic viscosity of this polyorganosiloxane (II) is at least equal to 10 mPa·s and preferably between 20 and 1000 mPa·s. The polyorganosiloxane (II) may be formed solely from units of formula (II-1) or may also comprise units of formula (II-2). The polyorganosiloxane (II) may have a linear, branched, cyclic or network structure. The group L has the same meaning as the group Z above. Examples of units of formula (II-1) are $H(CH_3)_2 SiO_{1/2}$, $HCH_3 SiO_{2/2}$ and $H(C_6H_5)SiO_{2/2}$.

The examples of units of formula (II-2) are the same as those given above for the units of formula (I-2).

Examples of polyorganosiloxanes (II) are linear and cyclic compounds, for instance:
dimethylpolysiloxanes containing hydrogenodimethylsilyl end groups,
copolymers containing (dimethyl)(hydrogenomethyl)polysiloxane units containing trimethylsilyl end groups,
copolymers containing (dimethyl)(hydrogenomethyl)polysiloxane units containing hydrogenodimethylsilyl end groups,
hydrogenomethylpolysiloxanes containing trimethylsilyl end groups,
cyclic hydrogenomethylpolysiloxanes.

The compound (II) may optionally be a mixture of a dimethylpolysiloxane containing hydrogenodimethylsilyl end groups and of a polyorganosiloxane bearing at least three functions SiH (hydrogenosiloxyle).

The ratio of the number of hydrogen atoms linked to silicon in the polyorganosiloxane (II) to the total number of groups containing alkenyl unsaturation of the polyorganosiloxane (I) and of the resin (V) is between 0.4 and 10 and preferably between 0.6 and 5.

The bases of silicone polyaddition compositions may comprise only linear polyorganosiloxanes (I) and (II), for instance those described in patents: U.S. Pat. No. 3,220,972, U.S. Pat. No. 3,697,473 and U.S. Pat. No. 4,340,709 or may comprise both branched or network polyorganosiloxanes (I) and (II), for instance those described in patents: U.S. Pat. No. 3,284,406 and U.S. Pat. No. 3,434,366.

According to one particular embodiment, the following are used:
at least one linear polyorganosiloxane (I) comprising chains formed from units of formula (I-2) in which c=2, blocked at each of their ends with units of formula (I-1) in which a=1 and b=2, and
at least one linear polyorganosiloxane (II) comprising in its structure at least three hydrogen atoms linked to silicon, located in the chains and/or at chain ends;
and even more particularly:
at least one linear polyorganosiloxane (I) comprising chains formed from units of formula (I-2) in which c=2, blocked at each of their ends with units of formula (I-1) in which a=1 and b=2, and
at least one linear polyorganosiloxane (1) comprising chains formed from units of formula (II-1) in which d=1 and e=1 and optionally units of formula (II-2) in which g=2, blocked at each of their ends with units of formula (II-1) in which d=1 and e=2.

The catalysts (III) are also well known. The metals of the platinum group are those known under the name platinoids, this term combining, besides platinum, ruthenium, rhodium, palladium, osmium and iridium. Platinum and rhodium compounds are preferably used. Complexes of platinum and of an organic product described in patents U.S. Pat. No. 3,159,601, U.S. Pat. No. 3,159,602, U.S. Pat. No. 3,220,972 and European patents EP-A-0 057 459, EP-A-0 188 978 and EP-A-0 190 530, and complexes of platinum and of vinylorganosiloxanes described in patents U.S. Pat. No. 3,419,593, U.S. Pat. No. 3,715,334, U.S. Pat. No. 3,377,432 and U.S. Pat. No. 3,814,730 may be used in particular. The catalyst that is generally preferred is platinum. In this case, the weight amount of catalyst (III), calculated by weight of platinum metal, is generally between 2 and 400 ppm, preferably between 5 and 200 ppm on the basis of the total weight of the polyorganosiloxanes (I) and (II).

Advantageously, the process according to the invention uses a silicone composition (A) comprising at least one addition reaction retardant (VI) (curing inhibitor) and is chosen from the following compounds:

polyorganosiloxanes substituted with at least one alkenyl that may optionally be in cyclic form, tetramethylvinyltetrasiloxane being particularly preferred,
pyridine,
organic phosphines and phosphites,
unsaturated amides,
alkyl maleates, and
acetylenic alcohols.

These acetylenic alcohols (Cf. FR-B-1 528 464 and FR-A-2 372 874), which form part of the preferred hydrosilylation-reaction thermal blockers, have the formula:

in which formula:
R' is a linear or branched alkyl radical or a phenyl radical;
R" is H or a linear or branched alkyl radical or a phenyl radical; the radicals R', R" and the carbon atom a to the triple bond possibly forming a ring;
the total number of carbon atoms contained in R' and R" being at least 5 and preferably from 9 to 20.

The said alcohols are preferably chosen from those with a boiling point of greater than 250° C. Examples that may be mentioned include:
1-ethynyl-1-cyclohexanol;
3-methyl-1-dodecyn-3-ol;
3,7,1'-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol.

These α-acetylenic alcohols are commercial products.

Such a retardant (VI) is present in a proportion of up to 3000 ppm and preferably in a proportion of from 100 to 1000 ppm relative to the total weight of the organopolysiloxanes (I) and (II).

The present invention also relates to the silicone coating composition (A) that is curable by polyaddition reactions to improve the combing strength and the tear strength of a woven, knitted or nonwoven fibrous support, consisting of a mixture formed from:

(a) at least one polyorganosiloxane (I) containing, per molecule, at least two C2-C6 alkenyl groups linked to silicon, (b) at least one polyorganosiloxane (II) containing, per molecule, at least two hydrogen atoms linked to silicon, (c) a catalytically effective amount of at least one catalyst (III), composed of at least one metal belonging to the platinum group, (d) at least one adhesion promoter (IV), (e) an additive system (B) for improving the combing strength and the tear strength, the constituents of which are added sequentially or simultaneously to the mixture, consisting of a mixture of:

at least one polyorganosiloxane resin (V) present at up to 60% by weight relative to the total weight of the mixture and optionally mixed with at least one polyorganosiloxane serving as diluent, and calcium carbonate ($CaCO_3$) present at up to 19% by weight relative to the total weight of the mixture;

(f) optionally, at least one curing inhibitor (VI), (h) optionally, at least one coloration additive (VII), and (i) optionally, at least one additive (VIII) for improving the fire resistance.

As additive (VIII) for improving the fire resistance, examples that may be mentioned include compounds containing a phenyl group substituted with an amino (secondary or tertiary) group. Examples of such additives are found in the reference U.S. Pat. No. 5,516,938. The useful amounts of such additives are generally between 0.01 and 1 part by weight relative to the total amount of the composition.

The other constituents of this composition (A) are as defined in the process according to the invention.

According to another of its aspects, the present invention relates to a precursor system {two-pack (C)} for the silicone composition described above. Such a precursor system is in two separate parts A and B, which are intended to be mixed together to form the composition, one of these parts A or B comprising the catalyst (III) and only one polyorganosiloxane species (I) or (II).

Yet another characteristic of this precursor system (C) is that the resin (V) may be used in part A or part B or in both parts A and B, the catalyst (III) not needing to be present in part A or part B containing the polyorganosiloxane (II) and the resin (V).

In the case of the promoter system (IV-1) (IV-2) (IV-3), another characteristic of this precursor system is that its part A or B containing the polyorganosiloxane is free of compounds (IV-3) of the promoter (IV) and that its part A or B including the compound (IV-1) of the promoter (IV) does not comprise the catalyst (III).

The viscosity of the parts A and B and of their mutual mixture may be adjusted by varying the amounts of the constituents and by selecting polyorganosiloxanes of different viscosities.

Once mixed together, the parts A and B form a ready-to-use silicone composition, which may be applied to the support by any suitable coating means (for example by doctor blade or roll). A final deposited thickness after curing of between 25 and 300 μm and especially between 50 and 200 μm will generally be targeted. It is not necessary to have a uniform thickness, since, if the surface of the support is not regular, this may result in an irregular deposition. The compounds according to the invention are heat-cured and/or cured by electromagnetic radiation (radiation of accelerated electrons or "electron beam").

The compositions according to the invention may be used for covering or coating flexible supports, especially woven, knitted or nonwoven fibrous textiles, and preferably woven, knitted or nonwoven supports made of synthetic fibres, advantageously of polyester or polyamide.

The invention is also directed towards a woven, knitted or nonwoven fibrous support coated on one or two faces with an elastomer that may be obtained:

a)—by applying at least 10 g/m² onto one or two faces of a woven, knitted or nonwoven fibrous support of the silicone coating composition (A) described above or of the composition resulting from mixing the parts A and B of the two-pack system (B) described above, and curing the deposit formed in the preceding step to form an elastomer by heating to a temperature that may be up to 210° C. or by electromagnetic radiation, in particular by infrared radiation, or b) by the process according to the invention described above.

According to one preferred mode of the invention, the fibrous support is a fabric with an open contexture having a porosity >10 l/dm²/min according to ISO standard 9237.

Another aspect of the invention concerns an inflatable bag for protecting an occupant of a vehicle, formed from a support coated according to the procedure of the invention described above.

The invention also relates to the use of the two-pack system (B) according to the invention, of a curable silicone coating composition (A) according to the invention for coating the woven, knitted or nonwoven fibrous support. Preferably, these supports are intended to form inflatable bags for protecting the occupants of vehicles. In one preferred embodiment, the support is a fabric with an open contexture having a porosity >10 l/dm$^2$/min according to ISO standard 9237.

The covering or coating of at least one of the faces of the flexible support material, especially textile (for example polyamide fabric) is useful for manufacturing technical fabrics such as, especially, inflatable bags for the personal protection of the occupants of vehicles, in the event of an impact, tent webs, parachute webs and the like.

In this context, the compositions or the process according to the invention are found to be noteworthy not only for coating supports conventionally used especially in the manufacture of inflatable bags, but also for coating supports with an open contexture. The term "support with an open contexture" means supports with a porosity >10 l/dm$^2$/min according to ISO standard 9237. In the case of a fabric, the open contexture may especially be defined as corresponding to a number of warp and weft yarns per centimeter, the sum of which is less than or equal to 36.

As fabrics that are particularly recommended in the context of the present invention, mention will generally be made of fabrics whose uncoated weight is less than 200 g/m$^2$ and especially less than or equal to 160 g/m$^2$. Such fabrics, especially polyamide fabrics, having from 16×16 to 18×18 yarns/cm may thus be mentioned, for example fabrics of 470 dtex (decitex) having these characteristics.

It will be noted that substrates, especially fabrics, formed from technical textile fibres, i.e. textile fibres whose properties are improved compared with standard fibres, for example increased fastness, in order to impart particular properties or properties that are reinforced as a function of the applications of the coated support or fabric, may also be used.

For the coating of supports with an open contexture, it will be preferred to use compositions comprising oil (I) with a viscosity of between 10 000 and 200 000 mPa·s, especially between 30 000 and 170 000 mPa·s and in particular between 40 000 and 120 000 mPa·s, and resin (V) comprising units Q, especially at least 2% by weight of such units, preferably at least 5% and in particular from 5% to 12%.

A subject of the invention is thus also such a flexible support, especially a textile support, coated in accordance with the invention and thus possibly having the characteristics and properties indicated above.

By virtue of the properties and characteristics indicated above, inflatable bags for personal protection of the occupants of a vehicle may be made from fabrics of open contexture as described above, in particular polyamide or polyester fabrics, which, once coated, have good combing strength and tear strength, a weight of less than or equal to 200 g/m$^2$, and moreover having optimum properties especially in terms of impermeability, heat protection, porosity and pliability. This makes it possible to produce lighter inflatable bags for an equivalent thickness of coating, which have better performance qualities and are less expensive than bags made from the coated fabrics of the prior art. It is thus possible, for an equivalent weight, to increase the thickness of coating and improve the impermeability and heat protection.

In general, the coating that is concerned herein may correspond to the deposition of a single layer onto at least one of the faces of the flexible support material (primary coating). However, it may also concern the deposition of a second layer or optionally a third layer onto at least one of the faces of the already-coated support material (secondary coating) to have in total the desired thickness that ensures the best possible performance qualities in terms of impermeability and favourable feel characteristics.

The examples that follow, of the preparation of compositions and of their application as coating for polyamide fabric according to the process of the invention, will allow the invention to be understood more clearly and will allow its advantages and implementation variants to be highlighted. The performance qualities of the products resulting from the process according to the invention will be illustrated by means of comparative tests.

EXAMPLES

In these examples, the viscosity is measured using a Brookfield viscometer according to the indications of AFNOR standard NFT-76-106 of May 1982.

Example 1

1) Definition of the Constituents polyorganosiloxane (I): polydimethylsiloxane oil blocked at each of the ends of the chains with a $(CH_3)_2ViSiO_{0.5}$ unit, having a viscosity of 100 000 mPa·s and containing 0.003 Si—Vi function per 100 g of oil [constituently referred to hereinbelow as high-viscosity oil (I)];

polyorganosiloxane (I-a): a polydimethylsiloxane oil blocked at each of the ends of the chains with a $(CH_3)_2ViSiO_{0.5}$ unit, having a viscosity of 10 000 mPa·s and containing 0.005 Si—Vi residue per 100 g of oil [constituent referred to hereinbelow as low-viscosity oil (I)];

polyorganosiloxane referred to hereinbelow as diluent (A): a polydimethylsiloxane oil blocked at each of the ends of the chains with a $(CH_3)_2ViSiO_{0.5}$ unit, having a viscosity of 60 000 mPa·s;

polyorganosiloxane referred to hereinbelow as diluent (B): a polydimethylsiloxane oil blocked at each of the ends of the chains with a $(CH_3)_2ViSiO_{0.5}$ unit, having a viscosity of 3500 mPa·s;

polyorganosiloxane (II): poly(dimethyl)(hydrogenomethyl)siloxane oil blocked at each of the ends of the chains with a $(CH_3)_2HSiO_{0.5}$ unit, having a viscosity of 25 mPa·s and containing in total 0.7 Si—H function per 100 g of oil (including 0.6 Si—H function located in the chain) [constituent referred to hereinbelow as oil (II)];

catalyst (III): platinum metal, introduced in the form of an organometallic complex containing 10% by weight of platinum metal, known under the name Karstedt catalyst [constituent referred to hereinbelow as platinum of the catalyst (III)];

adhesion promoters (IV): mixture composed of:
(IV-1) vinyltrimethoxysilane (VTMO),
(IV-2) glycidoxypropyltrimethoxysilane (GLYMO), and
(IV-3) butyl titanate Ti(OBu)4 (TBT);

resin (V): polyorganosiloxane of formula $MM^{Vi}DD^{Vi}Q$ containing 0.8% by weight of vinyl groups (Vi) and consisting of 27% by weight of $(CH_3)_3SiO_{0.5}$ units, 0.15% by weight of $(CH_3)_2ViSiO_{0.5}$ units, 60% by weight of $(CH_3)_2SiO$ units, 2.4% by weight of $(CH3)ViSiO$ units and 9.6% by weight of $SiO_2$ units;

calcium carbonate (1), $CaCO_3$ (Albacar® 5970), precipitated calcium carbonate, equivalent mean diameter: 2 µm and acicular shape which has not undergone a compatibilization treatment (heating or surface functionalization).

calcium carbonate (2), $CaCO_3$ (Socal® 31 sold by the company Solvay), equivalent mean diameter: 0.07 µm;

calcium carbonate (3), $CaCO_3$ (BLR3® 31 sold by the company Omya), equivalent mean diameter: 0.07 µm filler (VII-C): ground quartz with a mean particle size of about 2.5 µm and a BET surface area of about 3 m²/g, sold by the company Sifraco.

filler (VII-D): silica AEROSIL® R812;

2) Preparation of the Compositions a) Preparation of a composition from a two-pack precursor:

A composition is obtained by mixing together, at room temperature, 100 parts by weight of a part A and 10 parts by weight of a part B of a two-pack system (see composition of bi-component I and II in Tables I to IV).

b) The mixture is coated (deposited weight between 30 to 36 g/m²) to form a layer using doctor blades or rolls onto a polyhexamethyleneadipamide fabric of desized 6.6 type with a yarn count of 235 decitex (dtex) and having a contexture of 28.5×28.5 yarns/cm, and c) the resulting layer is cured for 80 seconds at 180° C. in a Mathis oven to obtain an elastomer. The results of the tests are given in Tables V and VI.

Compositions I-1 to I-8 are compositions according to the invention. Compositions C-1, C-2, C-3 and C-4 are comparative.

TABLE I

Composition of bi-component I (part A and B).

| Compositions | C1 | I-1 | I-2 | I-3 | C-2 | C-3 |
|---|---|---|---|---|---|---|
| Part A | | | | | | |
| Number of parts by weight | | | | | | |
| Composition containing 40% by weight of resin (V) and 60% by weight of diluent (A) | 47.7 | 47.7 | 47.7 | 47.7 | 40 | 47.7 |
| Filler (VII-C) | 0 | 0 | 0 | 0 | 32 | 16 |
| Low-viscosity oil (I) | 0 | 0 | 0 | 0 | 7 | 3.5 |
| High-viscosity oil (I) | 45 | 40 | 27 | 19 | 13 | 29 |
| Albacar © 5970 $CaCO_3$ | 0 | 5 | 16 | 24 | 0 | 0 |
| Oil (II) | 6 | 6 | 6 | 6 | 6 | 6 |
| VTMO | 1 | 1 | 1 | 1 | 1 | 1 |
| GLYMO | 1 | 1 | 1 | 1 | 1 | 1 |
| Part B | | | | | | |
| Composition containing 40% by weight of resin (V) and 60% by weight of diluent (A) | 45 | 45 | 45 | 45 | 45 | 45 |
| High-viscosity oil (I) | 51 | 51 | 51 | 51 | 51 | 51 |
| TBT | 4 | 4 | 4 | 4 | 4 | 4 |
| Catalyst (III) | 0.02 | 0.02 | 0.02 | 0.02 | 0.02 | 0.02 |
| Shore A hardness test of the elastomer obtained by combining 100 parts of A and 10 parts of B, followed by curing at 150° C.-10 min | 33 | 36 | 42 | 52 | 52 | 40 |

After mixing 100 parts by weight of part A and 10 parts by weigh of part B of bi-component I described in Table I, the resulting composition has the following contents of calcium carbonate and resin (V) (see Table II):

TABLE II

| Compositions | I-1 | I-2 | I-3 |
|---|---|---|---|
| Calcium carbonate (1) albacar © 5970 % by weight relative to the total weight of the mixture | 4.5 | 14.7 | 22.1 |
| Résin (V) % by weight relative to the total weight of the mixture | 18.8 | 19.2 | 19.2 |

TABLE III

Composition of bi-component II (part A and B)

| Compositions | C4 | I-4 | I-5 | I-6 | I-7 | I-8 |
|---|---|---|---|---|---|---|
| Part A (number of part by weight) | | | | | | |
| Composition containing 40% by weight of resin (V) and 60% by weight of diluent (A) | 0 | 46 | 25.2 | 46.0 | 46.0 | 46.0 |
| Low-viscosity oil (I) | 60.1 | | | | | |
| High-viscosity oil (I) | 29.85 | 29.85 | 52.15 | 29.85 | 29.85 | 29.85 |
| Calcium carbonate (1) Albacar © 5970 | | 16.10 | 16.10 | | | |
| Calcium carbonate (2): Socal © 31 | | | | | | 8.0 |
| Calcium carbonate (3): BLR3 © | | | | 16.1 | 14.1 | 8.1 |
| Filler (VII-d) Silica AEROSIL ® R 812 | 5 | | | | 2.0 | |
| ECH (VI) | 0.025 | 0.025 | 0.025 | 0.025 | 0.025 | 0.025 |
| Oil (II) | 3.0 | 6 | 4.5 | 6 | 6 | 6 |

TABLE III-continued

Composition of bi-component II (part A and B)

| Compositions | C4 | I-4 | I-5 | I-6 | I-7 | I-8 |
|---|---|---|---|---|---|---|
| VTMO | 1 | 1 | 1 | 1 | 1 | 1 |
| GLYMO | 1 | 1 | 1 | 1 | 1 | 1 |
| Part B (number of part by weight) | | | | | | |
| Composition containing 40% by weight of resin (V) and 60% by weight of diluent (A) | 0 | 44.8 | 0 | 44.8 | 44.8 | 44.8 |
| High-viscosity oil (I) | 51 | 51 | 51 | 51 | 51 | 51 |
| Low-viscosity oil (I) | 44.8 | | 44.8 | | | |
| TBT | 4 | 4 | 4 | 4 | 4 | 4 |
| Catalyst (III) | 0.02 | 0.02 | 0.02 | 0.02 | 0.02 | 0.02 |
| Shore A hardness test of the elastomer obtained by combining 100 parts of A and 10 parts of B, followed by curing at 150° C.-10 min | Not measured | 45 | 28 | 39 | 43 | 41.5 |

After mixing 100 parts by weight of part A and 10 parts by weigh of part B of bi-component II described in Table III, the resulting composition has the following contents of calcium carbonate and resin (V) (see Table IV):

TABLE IV

| Compositions | I-4 | I-5 | I-6 | I-7 | I-8 |
|---|---|---|---|---|---|
| Calcium carbonate (1) albacar © 5970 % by weight relative to the total weight of the mixture | 14.6 | 14.6 | | | |
| Calcium carbonate (2): Socal © 31 % by weight relative to the total weight of the mixture | | | | | 7.3 |
| Calcium carbonate (3): BLR3 © % by weight relative to the total weight of the mixture | | | 14.6 | 12.8 | 7.4 |
| Résin (V) % by weight relative to the total weight of the mixture | 18.4 | 9.2 | 18.4 | 18.4 | 18.4 |
| Filler (VII-d) Silica AEROSIL ® R 812 | | | | | 1.8 |

TABLE V

Results with a PA-6,6 fabric (batch 1, 235 dtex, 28.5 × 28.5 yarns/cm, bi-component I)

| Compositions | C1 | I-1 | I-2 | I-3 | C-2 | C-3 |
|---|---|---|---|---|---|---|
| Combing strength (N) (warp/weft) | 525/523 | 580/560 | 730/693 | 840/820 | 700/650 | 650/630 |
| Improvement (%) relative to the reference composition C1 | 0 | 10.48 | 35.78 | 60 | 33 | 23.81 |
| Tearing strength (N) | 189 | 150 | 142 | 121 | 75 | 85 |
| Abrasion resistance (scrub test in cycles) | >1000 | >1000 | >1000 | >1000 | 500 | 800 |

TABLE VI

Results with a PA-6,6 fabric (batch 2, 235 dtex, 28.5 × 28.5 yarns/cm, bi-component II)

| Compositions | C4 | I-4 | I-5 | I-6 | I-7 | I-8 |
|---|---|---|---|---|---|---|
| Combing strength (N) (warp) | 570 | 871 | 749 | 721 | 806 | 798 |
| Tearing strength (N) | 147 | 116 | 131 | 102 | 94 | 99 |
| Abrasion resistance (scrub test in cycles) | >1000 | >1000 | >1000 | >1000 | >1000 | >1000 |

(1) The test of resistance to creasing and to abrasion ("scrub" test) (ISO standard 5981 A) reflects the adhesion and the ageing behaviour of the composition. This test consists in subjecting the fabric firstly to a shear movement using two jaws pinching the two opposite edges of a sample and driven in an alternating motion relative to each other, and secondly to an abrasion by contact with a mobile support.

(2) The combing strength measurements are performed according to the indications of ASTM standard D 6479 (for determining the edgecomb resistance of woven facbrics).

(3) The tear strength measurements are performed according to the protocol of ISO standard 13937-2.

The best results are obtained for the system resin (V) and calcium carbonate albacar© 5970.

Example 2

For the compositions C1 (Comparative) and I-2 (Invention), the procedure described in Example 1, paragraphs 2a)

to c), is repeated for fabrics of polyhexamethyleneadipamide type of type 6.6 (PA-6,6), which are representative of the market, and various conditions for curing the elastomer. The results are given in Table VII.

TABLE VII

| Fabric Dtex | Contexture (warp/weft) Number of yarns/cm | Curing conditions °C./s | Combing strength with elastomer derived from composition C1 (N) Warp | Combing strength with elastomer derived from composition C1 (N) Weft | Combing strength with elastomer derived from composition I-2 (N) Warp | Combing strength with elastomer derived from composition I-2 (N) Weft | % variance (gain) |
|---|---|---|---|---|---|---|---|
| 235 | 28.5 × 28.5 | 180-80 | 525 | 523 | 730 | 693 | +36 |
| 350 | 23 × 24 | 180-80 | 679 | 624 | 850 | 724 | +20 |
| 350 | 23 × 24 | 180-30 | 650 | 627 | 857 | 780 | +28 |
| 350 | 23 × 24 | 200-30 | 692 | 625 | 869 | 845 | +30 |
| 580 | 17 × 17 | 180-80 | 452 | 469 | 550 | 506 | +14 |
| 580 | 17 × 17 | 180-30 | 482 | 433 | 588 | 548 | +24 |
| 580 | 17 × 17 | 200-30 | 443 | 403 | 568 | 540 | +31 |
| 580 | 16 × 16 | 180-80 | 373 | 419 | 526 | 515 | +31 |
| 580 | 16 × 16 | 180-30 | 365 | 358 | 454 | 454 | +26 |
| 580 | 16 × 16 | 200-30 | 422 | 415 | 532 | 465 | +19 |

The gain in combing strength of formula I-2 is significant on a wide variety of fabrics with very different curing conditions (time and temperature).

Example 3

Control Composition C-4 a) A control composition C-4 is prepared by mixing together 100 parts by weight of a part A and 10 parts by weight of a part B of a two-pack system (see composition below).

| Compositions | C4 |
|---|---|
| Part A: | |
| Number of parts by weight | |
| Composition containing 25% by weight of resin (V) and 75% by weight of diluent (B) | 47.7 |
| Low-viscosity oil (I) | 45.6 |
| $CaCO_3$ | 0 |
| Oil (II) | 6 |
| VTMO | 1 |
| GLYMO | 1 |
| Part B: | |
| Composition containing 40% by weight of resin (V) and 60% by weight of diluent (A) | 45 |
| High-viscosity oil (I) | 51 |
| TBT | 4 |
| Catalyst (III) | 0.02 | b) A comparative test is performed between compositions I-2 (invention) and C-4 (comparative) which are coated onto fabrics with different contextures (Table VIII). To do this, each composition is coated, using a doctor blade depositing an amount of about 50 g/m² to form a layer on the fabric; and c) the resulting layer is cured for 80 seconds at 180° C. in a ventilated oven to obtain an elastomer. The results of the tests are given in Table IX.

TABLE VIII

| Nature of the test supports | |
|---|---|
| Nature | Polyamide 6.6 |
| Weight in g of 10 000 m of yarn | 470 dTex |
| Contexture | 18/18 (18 yarns in warp and weft per cm) |
| Weight in g of 10 000 m of yarn | 470 dTex |
| Contexture | 16/16 (16 yarns in warp and weft per cm) |
| Weighting of 10 000 m of yarn | 470 dTex, |
| Contexture | 13.5/13.5 (13.5 yarns in warp and weft per cm) |

TABLE IX

| Composition | Reference | Actual g/m² | Scrub 1000 cycles | TS N | % Perf. | CS N | % Perf. | Coeff. friction |
|---|---|---|---|---|---|---|---|---|
| 18/18 Reference untreated fabric | | | | 232 | | 264 | | |
| C-4 | 1 | 50 | OK | 446 | +110 | 326 | +23 | 1.8 |
| I-2 | 2 | 52 | OK | 356 | +70 | 433 | +64 | 0.7 |
| 16/16 Reference untreated fabric | | | | 210 | | 198 | | |
| C-4 | 3 | 52 | OK | 387 | +67 | 251 | +26 | 2.8 |
| I-2 | 4 | 48 | OK | 347 | +50 | 353 | +78 | 0.8 |
| 13.5/13.5 Reference untreated fabric | | | | 178 | | 36 | | |
| C-4 | 5 | 50 | OK | 316 | +77 | 127 | +303 | 0.9 |
| I-2 | 6 | 53 | OK | 311 | +75 | 193 | +467 | 1.1 |

TS = tear strength (N)

CS = combing strength (N)

Scrub = abrasion resistance (scrub test in cycles)

Coefficient of friction (Ks): measurement of the coefficient of friction according to ISO standard 8295.

The results show that the performance level of a coated 470 dtex 18×18 fabric treated with composition C-4 has a combing strength comparable to the 470 dtex 16×16 fabric treated with composition I-2 with entirely acceptable performance qualities in terms of tear strength of the coated fabric.

Furthermore, it is seen that a 13.5/13.5 reference untreated fabric that is initially unusable for airbag applications on account of poor tear strength properties (178 N) and poor combing strength properties (36 N), when treated by means of the process according to the invention, becomes entirely usable for applications in the field of airbags (tear strength: 311 N/combing strength: 193 N).

The invention claimed is:

1. A process for improving the combing strength and the tear strength of a woven, knitted or nonwoven fibrous support, comprising the following steps:
   a) preparing a curable silicone coating composition comprising:
      (1) a polyorganosiloxane blend that is curable by polyaddition reactions, said blending comprising:
         at least one polyorganosiloxane (I) containing, per molecule, at least two C2-C6 alkenyl groups linked to silicon, and
         at least one polyorganosiloxane (II) containing, per molecule, at least two hydrogen atoms linked to silicon,
      (2) an effective amount of curing catalyst comprising at least one metal (or compound containing a metal) of the platinum group,
      (3) optionally, at least one adhesion promoter (IV), and
      (4) an additive system for improving the combing strength and the tear strength, said additive system comprising a pre-mix of:
         at least one polyorganosiloxane resin (V), optionally mixed with at least one polyorganosiloxane serving as diluent, and
         calcium carbonate ($CaCO_3$);
      wherein said at least one polyorganosiloxane resin (V) is present in a non-zero amount of up to 60% by weight relative to the total weight of the curable silicone coating composition and calcium carbonate is present from 10% to 24% by weight relative to the total weight of curable silicone coating composition;
   b) applying to one or two faces of a woven, knitted or nonwoven fibrous support at least 10 g/m² of the curable silicone coating composition prepared in step a), and
   c) curing the curable silicone coating composition applied in step b) to form an elastomer by heating to a temperature up to 210° C., optionally by electromagnetic radiation to form a support comprising a cured silicone composition,
   said support comprising said cured silicone composition having in combing strength relative to a comparable composition having ground quartz in place of calcium carbonate where said increase in combing strength occurs when said support comprises a conventional support used for making an airbag and when said support comprises an open contexture.

2. The process of claim 1, wherein calcium carbonate is present from 12% to 22% by weight relative to the total weight of curable silicone coating composition.

3. The process of claim 1, wherein the polyorganosiloxane resin (V) is present in the additive system in a non-zero amount of up to 40% by weight relative to the total weight of the curable silicone coating composition.

4. The process of claim 3, wherein the polyorganosiloxane resin (V) is present in the additive system in a proportion of up to 30% by weight relative to the total weight of curable silicone coating composition.

5. The process of claim 3, wherein the polyorganosiloxane resin (V) is present in the additive system in a proportion of from 5% to 30% by weight relative to the total weight of curable silicone coating composition.

6. The process of claim 1, wherein the curable silicone coating composition comprises a mixture formed from:
   (a) at least one polyorganosiloxane (I) containing, per molecule, at least two C2-C6 alkenyl groups linked to silicon,
   (b) at least one polyorganosiloxane (II) containing, per molecule, at least two hydrogen atoms linked to silicon,
   (c) a catalytically effective amount of at least one catalyst (III), comprising at least one metal belonging to the platinum group,
   (d) at least one adhesion promoter (IV),
   (e) an additive system for improving the combing strength and the tear strength, said additive system comprising a pre-mix formed from:
      at least one polyorganosiloxane resin (V), optionally mixed with at least one polyorganosiloxane serving as diluent, and
      carbon carbonate ($CaCO_3$);
   (f) optionally, at least one curing inhibitor (VI),
   (h) optionally, at least one coloration additive (VII), and
   (i) optionally, at least one additive (VIII) for improving fire resistance,
   wherein said at least one polyorganosiloxane resin (V) is present in a non-zero amount of up to 60% by weight relative to the total weight of curable silicone coating composition and calcium carbonate is present from 10% to 24% by weight relative to the total weight of curable silicone coating composition.

7. The process of claim 6, wherein calcium carbonate is present from 12% to 22% by weight relative to the total weight of curable silicone coating composition.

8. The process of claim 6, wherein the adhesion promoter (IV) of the curable silicone composition consists of:
   (IV.1) at least one alkoxylated organosilane containing, per molecule, at least one C2-C6 alkenyl group,
   (IV.2) at least one organosilicon compound comprising at least one epoxy radical, and
   (IV.3) at least one metal chelate M and/or a metal alkoxide of general formula: $M(OJ)n$, where n=valency of M, J=linear or branched C1-C8 alkyl group, and M is selected from the group consisting of Ti, Zr, Ge, Li, Mn, Fe, Al and Mg.

9. The process of claim 8, wherein the polyorganosiloxane resin (V) comprises in its structure from 0.1% to 20% by weight of alkenyl group(s), the said structure containing identical or different siloxyl units of type M, identical or different siloxyl units of type(s) T and/or Q, and optionally siloxyl unties of type D.

10. The process of claim 8, wherein the alkoxylated organosiloxane (IV.1) of the promoter (IV) comprises the following general formula:

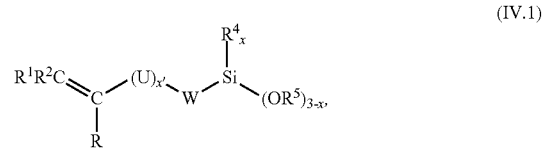

(IV.1)

wherein:
   $R^1$, $R^2$ and $R^3$ are identical or different hydrogenated or hydrocarbon-based radicals and represent hydrogen, a linear or branched C1-C4 alkyl or a phenyl optionally substituted with at least one C1-C3 alkyl,
   U is a linear or branched C1-C4 alkylene, W is a valency bond, $R^4$ and $R^5$ are identical or different radicals and represent a linear or branched C1-C4 alkyl radical, x'=0 or 1, and x=0 to 2.

11. The process of claim 10, in which the adhesion promoter (IV) comprises a mixture of:

vinyltrimethoxysilane (VTMO), representative of formula (IV.1), 3-glycidoxypropyltrimethoxysilane (GLYMO), representative of formula (IV.2), and butyl titanate, representative of formula (IV.3).

12. The process of claim 8, wherein the organosilicon compound (IV.2) of the promoter (V) is chosen from:

a) products (IV.2a) corresponding to the following general formula:

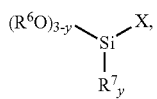
(IV.2a)

wherein:

$R^6$ is a linear or branched C1-C4 alkyl radical, $R^7$ is a linear or branched alkyl radical, y is equal to 0, 1, 2 or 3, and X is defined by the following formula:

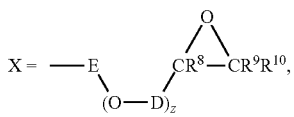

with:

E and D, are identical or different radicals chosen from linear or branched C1-C4 alkyls, z, which is equal to 0 or 1, $R^8$, $R^9$ and $R^{10}$, are identical or different radicals representing hydrogen or a linear or branched C1-C4 alkyl, and $R^8$, $R^9$ or $R^1$ alternatively optionally constituting, together and with the two carbons bearing the epoxy, a 5 to 7 membered alkyl ring, or b) products (IV.2b) comprising epoxy-functional polydiorganosiloxanes comprising:

(i) at least one siloxyl unit of formula:

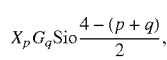
(IV.2 b1)

wherein:

X is the radical as defined above for formula (IV.2a)

G is a monovalent hydrocarbon-based group, free of unfavorable action on the activity of the catalyst and chosen from alkyl groups containing from 1 to 8 carbon atoms inclusive optionally substituted with at least one halogen atom, and also from aryl groups, p=1 or 2, q=0, 1 or 2, p+q=1, 2 or 3, and (2i) optionally at least one siloxyl unit of formula:

(IV.2 b2)

and wherein formula G has the same meaning as above and r is equal to 0, 1, 2 or 3.

13. The process of claim 8, wherein the metal M of the chelate and/or of the alkoxide (IV.3) is chosen from the group consisting of Ti, Zr, Ge, Li and Mn.

14. The process of claim 6, wherein the polyorganosiloxane resin (V) of the additive system comprises siloxyl units Q of formula $SiO_{4/2}$.

15. The process of claim 14, wherein the polyorganosiloxane resin (V) comprises at least 2% by weight of amyl units of type Q.

16. The process of claim 15, wherein the polyorganosiloxane resin (V) comprises at least 5% by weight of siloxyl units of type Q.

17. The process of claim 6, wherein the polyorganosiloxane (I) contains:

(i) siloxyl units of formula:

(I-1)

wherein:

the symbol $R^1$ represent an alkenyl group, preferably vinyl or allyl, the symbol Z, which may be identical or different, each represent a monovalent hydrocarbon-based group, free of unfavorable action on the activity of the catalyst and chosen from alkyl groups containing from 1 to 8 carbon atoms inclusive, optionally substituted with at least one halogen atom, and also from aryl groups, a is 1 or 2, b is 0, 1 or 2 and the sum a+b is equal to 1, 2 or 3, and optionally (ii) other siloxyl units of formula:

(I-2)

and wherein:

Z has the same meaning as above and c is 0, 1, 2 or 3.

18. The process of claim 6, wherein the polyorganosiloxane (II) comprises siloxyl units of formula:

(II-1)

wherein:

the groups L, which may be identical or different, each represent a monovalent hydrocarbon-based group, free of unfavorable action on the activity of the catalyst and chosen, preferably, from an alkyl group containing from 1 to 8 carbon atoms inclusive, optionally substituted with at least one halogen atom, advantageously from methyl, ethyl, propyl and 3,3,3-trifluoropropyl groups, an aryl group, and advantageously a xylyl, tolyl or phenyl radical, d is 1 or 2, a is 0, 1 or 2, the sum d+e is equal to 1, 2 or 3, and optionally, at least some of the other units being units of mean formula:

$$L_g SiO\frac{4-g}{2}, \quad (II\text{-}2)$$

and wherein the groups L have the same meaning as above and g is equal to 0, 1, 2 or 3.

19. The process of claim 6, wherein the proportions of the polyorganosiloxanes (I) and (II) are such that the molar ratio of the hydrogen atoms linked to silicon in (II) to the alkenyl radicals linked to silicon in (I) is between 0.4 and 10.

20. The process of claim 19, wherein the proportion of the polyorganosiloxanes (I) and (II) are such that the molar ratio of the hydrogen atoms linked to silicon in (II) to the alkenyl radicals linked to silicon in (I) is between 0.6 and 5.

21. A woven, knitted or nonwoven support coated on one or two faces with an elastomer obtained by:
(a) applying:
(1) at least 10 g/m² of a curable silicone coating composition curable by polyaddition reaction onto one or two faces of the woven, knitted or nonwoven fibrous support, the curable silicone coating composition comprising:
(i) at least one polyorganosiloxane (I) containing, per molecule, at least two C2-C6 alkenyl groups linked to silicon,
(ii) at least one polyorganosiloxane (II) containing, per molecule, at least two hydrogen atoms linked to silicon,
(iii) a catalytically effective amount of at least one catalyst (III), composed of at least one metal belonging to the platinum group,
(iv) at least one adhesion promoter (IV),
(v) an additive system for improving the combing strength and the tear strength, said additive system comprising a pre-mix formed from:
at least one polyorganosiloxane resin (V), optionally mixed with at least one polyorganosiloxane serving as diluent, and
calcium carbonate (CaCO₃);
(vi) optionally, at least one curing inhibitor (VI),
(vii) optionally, at least one coloration additive (VII), and
(viii) optionally, at least one additive (VII) for improving the fire resistance,
wherein said at least one polyorganosiloxane resin (V) is present in a non-zero amount of up to 60% by weight relative to the total weight of the curable silicone coating composition and calcium carbonate is present from 10% to 24% by weight relative to the total weight of the curable silicone coating composition; or
(2) a composition resulting from mixing part A and part B of a two-pack system, where the two separate parts A and B are intended to be mixed together to form the composition and one of the parts A or B comprise the catalyst (III) and only one polyorganosiloxane species (I) or (II), and
(b) curing the deposit formed in the preceding step to form an elastomer by heating to a temperature up to 210° C., optionally by electromagnetic radiation; to form a support comprising a cured silicone composition,
said support comprising said cured silicone composition having an increase in combing strength relative to a comparable composition having ground quartz in place of calcium carbonate where said increase in combing strength occurs when said support comprises a conventional support used for making an airbag and when said support comprises an open contexture.

22. The support of claim 21, wherein calcium carbonate is present from 12% to 22% by weight relative to the total weight of curable silicone coating composition.

23. An inflatable bag for protecting an occupant of a vehicle, the inflatable bag being formed from a support coated according to claim 21.

24. A method of coating a woven, knitted or nonwoven fibrous support, the method comprising:
(a) forming a coating on said support by applying to the support:
(1) a two-pack system comprising two separate parts A and B, which are intended to be mixed together to form a silicone coating composition curable by polyaddition reaction, one of the parts A or B comprising (i) a catalyst (III) comprised of at least one metal of the platinum group and (ii) either one polyorganosiloxane species (I) containing, per molecule, at least two C2-C6 alkenyl groups linked to silicon or one polyorganosiloxane species (II) containing, per molecule, at least two hydrogen atoms linked to silicon, wherein at least one polyorganosiloxane resin (V) is present in part A or part B or in both parts A and B,
wherein the two-pack system further comprises calcium carbonate (CaCO₃) in an amount from 10% to 24% by weight relative to the total weight of the two-pack system; and wherein the support is a fabric with an open contexture having a porosity >10 l/dm²/min according to ISO standard 9237, and
(b) curing said coating on said support to form a support comprising a cured silicone composition,
said support comprising said cured silicone composition having an increase in combing strength relative to a comparable composition having ground quartz in place of calcium carbonate where said increase in combing strength occurs when said support comprises a conventional support used for making an airbag and when said support comprises an open contexture.

25. The method of claim 24, wherein calcium carbonate is present from 12% to 22% by weight relative to the total weight of curable silicone coating composition.

26. A process for improving the combing strength and the tear strength of a woven, knitted or nonwoven fibrous support, the process comprising the following steps:
a) preparing a curable silicone coating composition comprising:
(1) a polyorganosiloxane blend curable by polyaddition reactions, said blend comprising:
at least one polyorganosiloxane (I) containing, per molecule, at least two C2-C6 alkenyl groups linked to silicon, and
at least one polyorganosiloxane (II) containing, per molecule, at least two hydrogen atoms linked to silicon,
(2) an effective amount of curing catalyst comprising at least one metal (or compound) of the platinum group,
(3) optionally, at least one adhesion promoter (IV), and
(4) an additive system for improving the combing strength and the tear strength, said additive system consisting of a pre-mix of:

at least one polyorganosiloxane resin (V) which is present in a non-zero amount of up to 60% by weight relative to the total weight of the curable silicone coating composition, calcium carbonate ($CaCO_3$) in an amount 10% to 24% by weight relative to the total weight of curable silicone coating composition, and a polydimethylsiloxane diluent;

b) applying to one or two faces of a woven, knitted or nonwoven fibrous support at least 10 g/m² of the curable silicone coating composition prepared in step a), and c) curing the deposit formed in step b) to form an elastomer by heating to a temperature up to 210° C., optionally by electromagnetic radiation, to form a support comprising a cured silicone composition, said support comprising said cured silicone composition having an increase in combing strength relative to a comparable composition having ground quartz in place of calcium carbonate where said increase in combing strength occurs when said support comprises a conventional support used for making an airbag and when said support comprises an open contexture.

27. The process of claim 26, wherein calcium carbonate is present from 12% to 22% by weight relative to the total weight of curable silicone coating composition.

28. A woven, knitted or nonwoven support coated on one or two faces with an elastomer obtained by
   (a) preparing a curable silicone coating composition comprising:
      (i) a polyorganosiloxane blend curable by polyaddition reactions, comprising:
         at least one polyorganosiloxane (I) containing, per molecule, at least two C2-C6 alkenyl groups linked to silicon, and
         at least one polyorganosiloxane (II) containing, per molecule, at least two hydrogen atoms linked to silicon,
      (ii) an effective amount of curing catalyst comprising at least one metal (or compound) of the platinum group,
      (iii) optionally, at least one adhesion promoter (IV), and
      (iv) an additive system for improving the combing strength and the tear strength, the constituents of which are added sequentially or simultaneously, comprising a pre-mix of;
         at least one polyorganosiloxane resin (V), optionally mixed with at least one polyorganosiloxane serving as diluent, and
         calcium carbonate ($CaCO_3$);
   wherein said at least one polyorganosiloxane resin (V) is present in a non-zero amount of up to 60% by weight relative to the total weight of curable silicone coating composition and calcium carbonate is present from 10% to 24% by weight relative to the total weight of curable silicone coating composition;
   (b) applying at least 10 g/m², to one or two faces of a woven, knitted or nonwoven fibrous support of the curable silicone coating composition (A) prepared in step a), and
   (c) curing the deposit formed in step b) to form an elastomer by heating to a temperature up to 210° C., optionally by electromagnetic radiation, to form a support comprising a cured silicone composition, said support comprising said cured silicone composition having an abrasion resistance, measured by ISO standard 5981, of greater than 1000, a tear strength of from 94 to 142 N, measured by ISO standard 13937-2 and an increase in combing strength relative to a comparable composition having ground quartz in place of calcium carbonate and wherein the fibrous support is a fabric with an open contexture having a porosity >10 l/dm²/min according to ISO standard 9237.

29. The support of claim 28, wherein calcium carbonate is present from 12% to 22% by weight relative to the total weight of curable silicone coating composition.

30. An inflatable bag for protecting an occupant of a vehicle, the inflatable bag being formed from a support coated according to claim 28.

31. A method of coating a woven, knitted or nonwoven fibrous support, the method comprising:
   (a) forming a coating on said support by applying to the support a curable silicone coating composition comprising:
      (1) a polyorganosiloxane blend curable by polyaddition reactions, comprising: at least one polyorganosiloxane (I) containing, per molecule, at least two C2-C6 alkenyl groups linked to silicon, and
         at least one polyorganosiloxane (II) containing, per molecule, at least two hydrogen atoms linked to silicon,
      (2) an effective amount of curing catalyst comprising at least one metal (or compound) of the platinum group,
      (3) optionally, at least one adhesion promoter (IV), and
      (4) an additive system for improving the combing strength and the tear strength, said additive system comprising a pre-mix of:
         at least one polyorganosiloxane resin (V), optionally mixed with at least one polyorganosiloxane serving as diluent, and
         calcium carbonate ($CaCO_3$);
   wherein said at least one polyorganosiloxane resin (V) is present in a non-zero amount of up to 60% by weight relative to the total weight of the curable silicone coating composition and calcium carbonate is present from 10% to 24% by weight relative to the total weight of the curable silicone coating composition, and
   (b) curing said coating on said support to form a support comprising a cured silicone composition,
   said support comprising said cured silicone composition having an increase in combing strength relative to a comparable composition having ground quartz in place of calcium carbonate.

32. The process of claim 31, wherein calcium carbonate is present from 12% to 22% by weight relative to the total weight of curable silicone coating composition.

33. The method of claim 31, wherein the fibrous support is a fabric with an open contexture having a porosity >10 l/dm²/min according to ISO standard 9237.

34. An inflatable bag for protecting an occupant of a vehicle, the inflatable bag being formed from a support coated according to claim 31.

* * * * *